US008859689B2

(12) United States Patent
Lu et al.

(10) Patent No.: US 8,859,689 B2
(45) Date of Patent: Oct. 14, 2014

(54) CONDUCTING POLYMER MATERIALS BASED ON CARBONYL-FUNCTIONALIZED POLYSILICONES AND METHODS FOR THEIR PREPARATION

(75) Inventors: Yun Lu, Nanjing (CN); Hongjuan Wang, Nanjing (CN)

(73) Assignee: Nanjing University, Nanjing (CN)

( * ) Notice: Subject to any disclaimer, the term of this patent is extended or adjusted under 35 U.S.C. 154(b) by 79 days.

(21) Appl. No.: 13/814,710

(22) PCT Filed: Nov. 10, 2011

(86) PCT No.: PCT/CN2011/082053
§ 371 (c)(1),
(2), (4) Date: Feb. 6, 2013

(87) PCT Pub. No.: WO2013/067702
PCT Pub. Date: May 16, 2013

(65) Prior Publication Data
US 2013/0169264 A1 Jul. 4, 2013

(51) Int. Cl.
H01B 1/00 (2006.01)
H01B 1/12 (2006.01)
C08F 283/12 (2006.01)
C08L 51/08 (2006.01)
C08L 65/00 (2006.01)
C08L 65/02 (2006.01)

(52) U.S. Cl.
CPC .............. *H01B 1/128* (2013.01); *C08F 283/12* (2013.01); *C08L 51/08* (2013.01); *C08L 65/00* (2013.01); *C08L 65/02* (2013.01); *C08G 2261/312* (2013.01); *C08G 2261/3221* (2013.01); *C08G 2261/3222* (2013.01); *C08G 2261/3223* (2013.01); *C08G 2261/3422* (2013.01)
USPC ........... 525/410; 525/411; 525/417; 525/474; 528/15; 528/26; 252/500; 257/791

(58) Field of Classification Search
USPC .............. 525/410, 411, 417, 474; 528/15, 26; 252/500; 257/791
See application file for complete search history.

(56) References Cited

U.S. PATENT DOCUMENTS 3,464,955 A * 9/1969 Bluestein .................. 528/41
5,484,858 A * 1/1996 Smits et al. ................ 525/393
5,595,680 A * 1/1997 Bryant et al. ................ 252/77
5,868,966 A * 2/1999 Wei et al. .................. 252/500
5,928,566 A * 7/1999 Angelopoulos et al. ...... 252/500
6,107,504 A * 8/2000 Yamamoto et al. .......... 556/439
6,616,863 B1 * 9/2003 Angelopoulos et al. ...... 252/500
2007/0059597 A1 * 3/2007 Nakanishi et al. ........... 429/188
2008/0210948 A1 * 9/2008 Sugawara et al. ............ 257/76
2009/0069512 A1 * 3/2009 Yeager et al. ................ 525/474

FOREIGN PATENT DOCUMENTS

CN          101200510 A       6/2008
JP            2018444 A       1/1990

OTHER PUBLICATIONS

Cadenas & Hu, Chemically stable conducting polyaniline composite coatings, Solar Energy Mater, Solar Cells, 55:105-112 (1998).
Chen & Fang, Electrically conductive polyaniline-poly(vinyl alcohol) composite films: physical properties and morphological structures, Macromolecules, 24:1242-1248 (1991).
Cong & Pan, Photopatternable conductive PDMS materials for microfabrication, Adv. Funct. Mater., 18:1912-1921 (2008).
Di Noto et al.; Two New Silxanic Proton-conducting membranes: Part I. Synthesis and Structural Characterization. Polymer Electrolytes, vol. 50, Issue 19, Jun. 30, 2005, pp. 3998-4006.
Niu et al., Characterizing and patterning of PDMS-based conducting composites, Adv. Mater, 19:2682-2686 (2007).
Ogura et al., The humidity dependence of the electrical conductivity of a soluble polyaniline-poly(vinyl alcohol ) composite film, J. Mater. Chem., 7:2363-2366 (1997).
Suresh Murugesan, In-situ preparation and structure-property studies of filler particles in poly(dimethylsiloxane) elastomers, Ph.D. Dissertation at the University of Cincinnati, Jun. 2, 2003.
Taranekar et al., Distinct surface morphologies of electropolymerized polymethylsiloxane network polypyrrole and comonomer films, Langmuir, 18: 7943-7952 (2002).
Xia et al., Ultrathin film electrodeposition of polythiophene conjugated networks through a polymer precursor route, Langmuir, 17: 7893-7898 (2001).
Wan et al., Transparent and conducting coating of polyaniline composites, Thin Solid Films, 259:188-193 (1995).
Wang et al., Effects of conductive phase content on critical pressure of carbon black filled silicone rubber composite, Sensors and Actuators A, 135:587-592 (2007).
Ma et al.: Synthesis of polysilicone containing epoxy group by hydrosilylation, Thermosetting Resin, 22(2):16-18 and 22 (2007).
International Search Report and Written Opinion dated Aug. 16, 2012 for PCT Application No. PCT/CN2011/082053, filed Nov. 10, 2011.

* cited by examiner

*Primary Examiner* — Margaret Moore
(74) *Attorney, Agent, or Firm* — Knobbe, Martens, Olson & Bear LLP

(57) ABSTRACT

Polymer compositions based on polyaniline and carbonyl-functionalized polysilicones, and methods for making these polymer compositions are disclosed in the present application. The polymer compositions have, for example, good solubility, processability, mechanical performance and conductivity.

28 Claims, 6 Drawing Sheets

CONDUCTING POLYMER MATERIALS BASED ON CARBONYL-FUNCTIONALIZED POLYSILICONES AND METHODS FOR THEIR PREPARATION

RELATED APPLICATIONS

The instant application is the U.S. National Phase under 35 U.S.C. §371 of International Application No. PCT/CN2011/082053 entitled CONDUCTING POLYMER MATERIALS BASED ON CARBONYL-FUNCTIONALIZED POLYSILICONES AND METHODS FOR THEIR PREPARATION, filed Nov. 10, 2011, designating the U.S. The content of this application is herein incorporated by reference in its entirety.

BACKGROUND

1. Field

The present application relates to conducting polymer materials and methods for their preparation.

2. Description of the Related Art

Conducting polymers such as polyacetylene, polyaniline, polypyrrole, polythiophene and their derivatives have been studied extensively due to the wide promising applications. However, applications of these conducting polymers can be limited by their insolubility in many commonly used solvents and poor processability. These conducting polymers can be blended with an insulating polymer matrix exhibiting the desired mechanical properties such as polymethyl methacrylate, polyvinyl carbazole, poly(vinyl alcohol), polysilicone, and polycarbonate. However, such composites are easy for phase separation due to poor compatibility. Substituted groups such as alkyloxy group or long-chain alkyl group can be introduced into aniline to increase solubility and/or processability of the polymers, but conductivity of the resulting products decreases significantly with moderate conductivities ($10^{-2}$-$10^{-4}$ S/cm) and the preparation methods can be complicated. There is a need for processable conducting polymers that can be made using simple preparation procedures.

SUMMARY

Some embodiments disclosed herein include a composition comprising a first polymer and a second polymer, wherein the first polymer comprises at least one first monomer unit represented by Formula I, and at least one second monomer unit represented by Formula II:

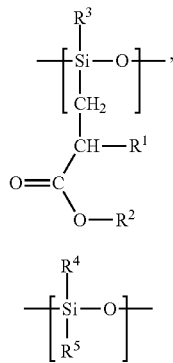

(I)

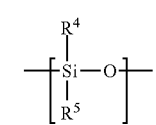

(II)

wherein $R^1$ is selected from the group consisting of hydrogen, $C_1$-$C_{12}$ alkyl, and $R^6$—$COOR^7$, wherein $R^6$ is absent or $C_1$-$C_{12}$ alkyl, $R^7$ is hydrogen or $C_1$-$C_{12}$ alkyl;

$R^2$ is $C_1$-$C_{12}$ alkyl;

$R^3$, $R^4$ and $R^5$ are each independently selected from the group consisting of alkyl, alkenyl, alkynyl, aryl, and cycloalkyl; and the second polymer comprises a recurring unit having a n-conjugated electron system.

In some embodiments, $R^1$ is selected from the group consisting of hydrogen, $C_1$-$C_6$ alkyl, and $R^6$—$COOR^7$, wherein $R^6$ is absent or $C_1$-$C_6$ alkyl, $R^7$ is hydrogen or $C_1$-$C_6$ alkyl; and $R^2$ is $C_1$-$C_6$ alkyl. In some embodiments, $R^1$ and $R^2$ are each independently $C_1$-$C_6$ alkyl.

In some embodiments, $R^3$, $R^4$ and $R^5$ are each independently selected from the group consisting of $C_1$-$C_{12}$ alkyl, $C_2$-$C_{12}$ alkenyl, $C_2$-$C_{12}$ alkynyl, phenyl, and $C_3$-$C_{12}$ cycloalkyl. In some embodiments, $R^3$, $R^4$ and $R^5$ are each independently selected from the group consisting of methyl, ethyl, propyl, butyl, octyl, trifluoropropyl, phenyl, and vinyl.

In some embodiments, the first monomer unit is:

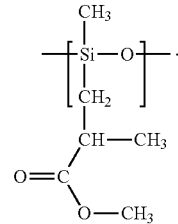

In some embodiments, the recurring unit is selected from the group consisting of:

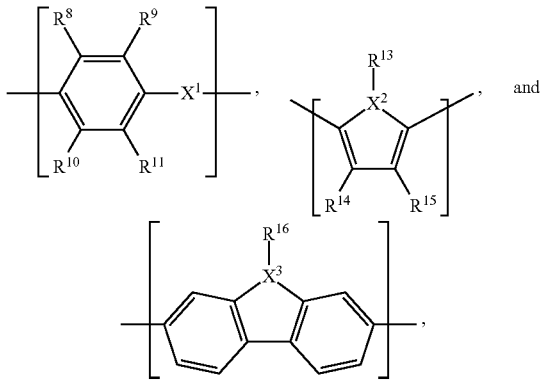

and wherein $X^1$ is selected from the group consisting of —$C_2H_2$—, —C≡C—, —$OR^{12}$, —$SR^{12}$, and —$NR^{12}$;

$X^2$ and $X^3$ are each independently selected from the group consisting of C, O, S, and N;

$R^8$ and $R^9$, are each independently selected from the group consisting of hydrogen, $C_1$-$C_{12}$ alkyl and $C_1$-$C_{12}$ alkoxy, or $R^8$ and $R^9$ are taken together to form a cycloalkyl, aryl or heterocycle;

$R^{10}$ and $R^{11}$ are each independently selected from the group consisting of hydrogen, $C_1$-$C_{12}$ alkyl and $C_1$-$C_{12}$ alkoxy, or $R^{10}$ and $R^{11}$ are taken together to form a cycloalkyl, aryl or heterocycle;

$R^{12}$ is absent or selected from the group consisting of hydrogen, $C_{1-12}$ alkyl, and $C_1$-$C_{12}$ alkoxy;

$R^{13}$ is absent or selected from the group consisting of hydrogen, $C_1$-$C_{12}$ alkyl, and aryl;

$R^{14}$ and $R^{15}$ are each independently selected from the group consisting of hydrogen, $C_1$-$C_{12}$ alkyl and $C_1$-$C_{12}$ alkoxy, or $R^{14}$ and $R^{15}$ are taken together to form a cycloalkyl, aryl or heterocycle; and $R^{16}$ is absent or selected from the group consisting of hydrogen, $C_1$-$C_{12}$ alkyl and aryl.

In some embodiments, the second polymer is selected from the group consisting of polyaniline, polyphenylene, polythiophene, polyfuran, polypyrrole, polycarbozole, polyphenylenevinylene (PPV), polyphenylene ethynylene (PPE) and derivatives thereof. In some embodiments, the second polymer is polyaniline.

In some embodiments, the composition has a weight ratio of the first polymer to the second polymer of about 1:99 to about 99:1. In some embodiments, the composition has a weight ratio of the first polymer to the second polymer of about 5:95 to about 90:10.

In some embodiments, the first polymer and the second polymer are coupled through hydrogen bonding.

In some embodiments, the composition has an average molecular weight of about $1.0 \times 10^4$ g/mol to about $3.5 \times 10^5$ g/mol.

In some embodiments, the composition is soluble in at least one organic solvent. In some embodiments, the organic solvent is selected from the group consisting of toluene, acetone, tetrahydrofuran (THF), dimethyl formamide (DMF), dichloroacetic acid (DCAA), and any combinations thereof.

In some embodiments, the composition has an electrical conductivity of about $10^{-5}$ S/cm to about 20 S/cm. In some embodiments, the composition has an electrical conductivity of about 0.1 S/cm to about 20 S/cm. In some embodiments, the composition has an electrical conductivity of about 10 S/cm to about 20 S/cm.

In some embodiments, the composition has the form of a film, membrane, rod, filament, fiber, or combinations thereof. In some embodiments, the composition has the form of a film. In some embodiments, the film has an average thickness of at least about 5 mm. In some embodiments, the film has an average thickness of about 0.1 mm to about 5 mm. In some embodiments, the film has an average thickness of about 0.4 mm.

In some embodiments, the film has a stress at break of about 3 MPa to about 6 MPa.

In some embodiments, the film has a Young's modulus of about 100 MPa to about 200 MPa.

In some embodiments, the film has a strain break of about 20% to about 40%.

Some embodiments disclosed herein include a method for making a conducting polymer composition, the method comprising: forming a first mixture comprising at least one catalyst, polymethylhydrosiloxane (PMHS), and a compound represented by Formula III

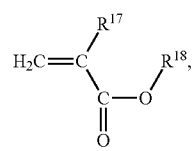

(III)

wherein $R^{17}$ is selected from the group consisting of hydrogen, $C_{1-12}$ alkyl, and $R^{19}$—COOR$^{20}$, wherein $R^{19}$ is absent or $C_{1-12}$ alkyl, $R^{20}$ is hydrogen or $C_{1-12}$ alkyl; and $R^{18}$ is $C_{1-12}$ alkyl;

maintaining the first mixture under conditions effective to polymerize the PMHS and the compound to form a copolymer;

forming a second mixture comprising at least one oxidizing agent, the copolymer, and at least one aniline monomer; and maintaining the second mixture under conditions effective to polymerize aniline monomer to form polyaniline.

In some embodiments, the compound is methyl methacrylate MMA), methyl acrylate, monomethylthaconate, or combination thereof.

In some embodiments, the oxidizing agent is selected from the group consisting of ammonium persulfate, sodium persulfate, potassium persulfate, $FeCl_3$, potassium iodate, a transition metal salt, hydrogen peroxide, and any combination thereof. In some embodiments, the transition metal salt is selected from the group consisting of $Ce^{4+}$ salts, $Cu^{2+}$ salts, $Cr^{6+}$ salts, $Mn^{7+}$ salts, and any combinations thereof. In some embodiments, the transition metal salt is selected from the group consisting of $(NH_4)_2Ce(NO_3)_6$, $CuCl_2$, $K_2CrK_4$, and $KMnO_4$. In some embodiments, the oxidizing agent is ammonium persulfate.

In some embodiments, the catalyst is $Cp_2PtCl_2$ or $H_2PtCl_6$.

In some embodiments, the weight ratio of the copolymer to the aniline monomer is about 10:1 to about 1:20. In some embodiments, the weight ratio of the copolymer to the aniline monomer is about 4:1.

In some embodiments, the first mixture is maintained at a temperature of about 80° C. to about 120° C.

In some embodiments, the first mixture is maintained for about 4 hours to about 24 hours.

In some embodiments, the second mixture is maintained for about 24 hours to about 96 hours.

In some embodiments, forming a second mixture comprises mixing the copolymer and the aniline monomer to form a third mixture; maintaining the third mixture in an acidic condition; and adding the oxidizing agent to the third mixture to form the second mixture.

In some embodiments, the third mixture is maintained in the acid condition for about 2 hours to about 8 hours.

Some embodiments disclosed herein include a polymer composition prepared according to any of the methods disclosed herein.

Some embodiments disclosed herein include a method for making a conducting polymer film, the method comprising: forming a mixture comprising a polymer composition and an organic solvent, wherein the polymer composition comprises a first polymer and a second polymer, wherein the first polymer comprises at least one first monomer unit represented by Formula IV, and at least one second monomer unit represented by Formula V:

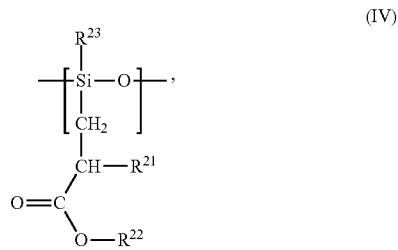

(IV)

-continued

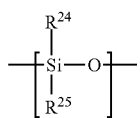
(V)

wherein R[21] is selected from the group consisting of hydrogen, $C_1$-$C_{12}$ alkyl, and R[26]—COOR[27], wherein R[26] is absent or $C_1$-$C_{12}$ alkyl, and R[27] is hydrogen or $C_1$-$C_{12}$ alkyl;

R[22] is $C_1$-$C_{12}$ alkyl;

R[23], R[24] and R[25] are each independently selected from the group consisting of alkyl, alkenyl, alkynyl, aryl, and cycloalkyl; and the second polymer comprises a recurring unit having a π-conjugated electron system; and contacting the mixture with a solid support to form the conducting polymer film.

In some embodiments, the first monomer unit is:

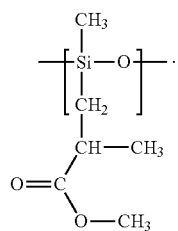

In some embodiments, the second polymer is selected from the group consisting of polyaniline, polyphenylene, polythiophene, polyfuran, polypyrrole, polycarbozole, polyphenylenevinylene (PPV), polyphenylene ethynylene (PPE) and derivatives thereof.

In some embodiments, the organic solvent is selected from the group consisting of dimethyl sulfoxide (DMSO), tetrahydrofuran (THF), dimethyl formamide (DMF), dichloroacetic acid (DCAA), and any combinations thereof. In some embodiments, the organic solvent is DCAA.

In some embodiments, the mixture is contacted with the solid support for about 2 hours to about 48 hours.

In some embodiments, the solid support comprises glass, polymethylpentene (TPX), polyethylene, polyethylene terephthalate (PET), or combinations thereof. In some embodiments, the solid support comprises polyethylene.

Some embodiments disclosed herein include a sensor comprising: an electrode on a substrate; and a sensing member covering the electrode, wherein the sensing member comprises a composition comprising a first polymer and a second polymer, wherein the first polymer comprises at least one first monomer unit represented by Formula VI, and at least one second monomer unit represented by Formula VII:

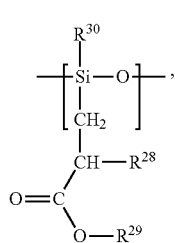
(VI)

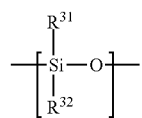
(VII)

wherein R[28] is selected from the group consisting of hydrogen, $C_{1-12}$ alkyl, and R[33]—COOR[34], wherein R[33] is absent or $C_{1-12}$ alkyl, and R[34] is hydrogen or $C_{1-12}$ alkyl;

R[29] is $C_{1-12}$ alkyl; and

R[30], R[31] and R[32] are each independently selected from the group consisting of alkyl, alkenyl, alkynyl, aryl, and cycloalkyl; and the second polymer comprises a recurring unit having a n-conjugated electron system.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 2 shows the $^1$H nuclear magnetic resonance (NMR) spectra of P(Si-g-MMA) and P(Si-g-MMA)-PAN in pure THF-$d_8$ and assignments of resonance peaks.

DETAILED DESCRIPTION

Figure 1:
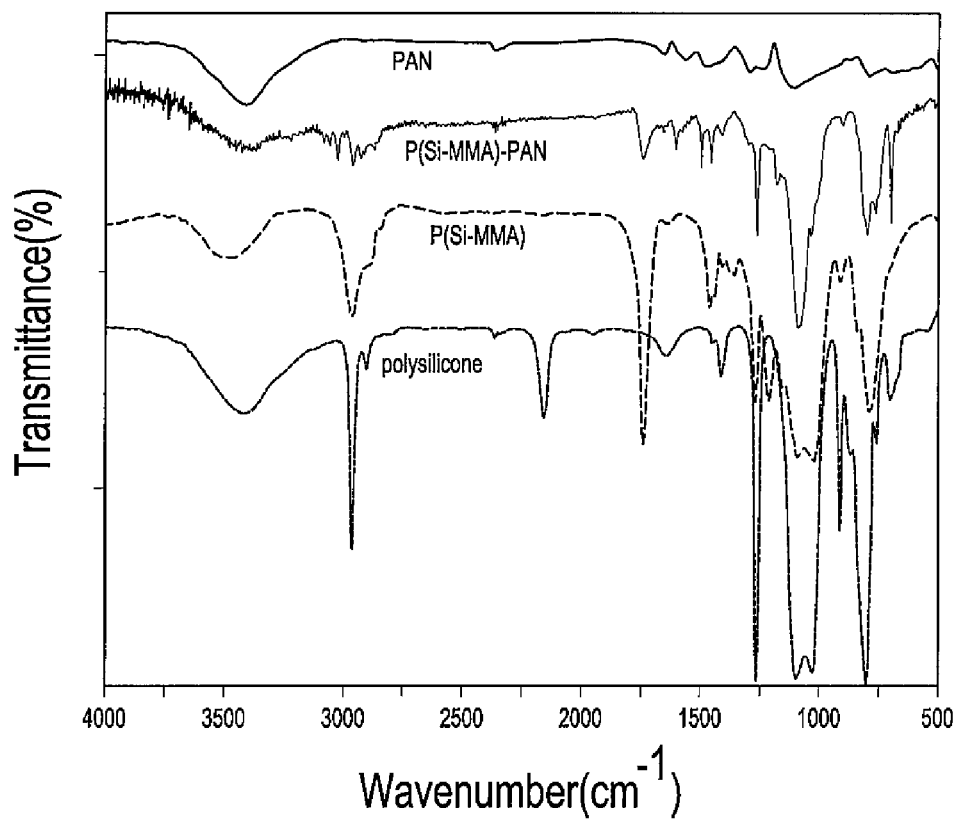
FIG. 1 shows the fourier-transform infrared (FT-IR) spectra of Polysilicone, P(Si-g-MMA), P(Si-g-MMA)-PAN, and PAN.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated and mark part of this disclosure.

Disclosed herein are polymer compositions having a first polymer and a second polymer, wherein the first polymer comprises at least one first monomer unit represented by Formula I, and at least one second monomer unit represented by Formula II:

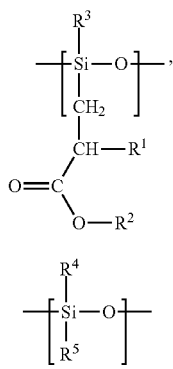

wherein $R^1$ is selected from the group consisting of hydrogen, $C_1$-$C_{12}$ alkyl, and $R^6$—$COOR^7$, wherein $R^6$ is absent or $C_1$-$C_{12}$ alkyl, and $R^7$ is hydrogen or $C_1$-$C_{12}$ alkyl; $R^2$ is $C_1$-$C_{12}$ alkyl; $R^3$, $R^4$ and $R^5$ are each independently selected from the group consisting of alkyl, alkenyl, alkynyl, aryl, and cycloalkyl, and the second polymer comprises a recurring unit having a π-conjugated electron system.

The polymer compositions disclosed herein have, for example, good solubility, processability, mechanical performance and/or electrical conductivity. Also disclosed herein are methods of making the polymer compositions. The methods can, in some embodiments, include standard polymerization procedures that may be easily scaled for manufacturing purposes. The present application also includes methods of using the polymer.

DEFINITIONS

Unless otherwise specifically noted herein, the terms set forth below will have the following definitions.

As used herein, the term "alkyl" refers to a straight or branched hydrocarbon chain that comprises a fully saturated (no double or triple bonds) hydrocarbon group. The alkyl group of the compounds may be designated as "$C_1$-$C_6$ alkyl" or similar designations. By way of example only, "$C_1$-$C_6$ alkyl" indicates that there are one to six carbon atoms in the alkyl chain, include, but not limited to, methyl, ethyl, propyl, butyl, tert-butyl, hexyl, 1-methylethyl, 1-methylpropyl, 2-methylpropyl, and 1,1-dimethylethyl. The alkyl may be substituted or unsubstituted. For example, the alkyl can be optionally substituted by one or more halogen.

As used herein, the term "halogen" refers to any one of the radio-stable atoms of column 7 of the Periodic Table of the Elements, such as, fluorine, chlorine, bromine and iodine.

As used herein, the term "alkenyl" refers to $C_2$-$C_{18}$ hydrocarbon containing normal, secondary, tertiary or cyclic carbon atoms with at least one site of unsaturation, i.e. a carbon-carbon, sp² double bond. Examples of alkenyl include, but are not limited to, ethylene or vinyl (—CH═CH₂), ally (—CH₂CH═CH₂), cyclopentenyl (—C₅H₇), and 5-hexenyl (—CH₂CH₂CH₂CH₂CH═CH₂). The alkenyl may be substituted or unsubstituted. For example, the alkenyl can be optionally substituted by one or more halogen.

As used herein, the term "alkynyl" refers to $C_2$-$C_{18}$ hydrocarbon containing normal, secondary, tertiary or cyclic carbon atoms with at least one site of unsaturation, i.e. a carbon-carbon, sp triple bond. Examples of alkynyl include, but are not limited to, acetylenic (—C≡CH) and propargyl (—CH₂C≡CH). The alkynyl may be substituted or unsubstituted. For example, the alkynyl can be optionally substituted by one or more halogen.

As used herein, the term "$C_{1-6}$ alkoxy" refers to an alkyl group with one to six carbon atoms attached to an oxygen atom. Alkoxy includes, for example, methoxy, ethoxy, propoxy, 1-methylethoxy, butoxy and 1,1-dimethylethoxy. The alkoxy may be substituted or unsubstituted. For example, the alkoxy can be optionally substituted by one or more halogen.

As used herein, the term "cycloalkyl" refers to a cycloalkyl substituent containing three to ten carbon atoms and includes, for example, cyclopropyl, cyclobutyl, cyclopentyl, cyclohexyl, cycloheptyl and spiro cyclic groups such as spirocyclopropyl as spirocyclobutyl. The cycloalkyl may be substituted or unsubstituted.

As used herein, the term "heterocycle" refers to 7-12 membered bicyclic heterocycles and 5-7 membered monocyclic heterocycles. Some embodiments of bicyclic heterocycles are 7-12 membered fused bicyclic ring systems (both rings share an adjacent pair of atoms) containing from one to four heteroatoms selected from nitrogen, oxygen and sulfur, wherein both rings of the heterocycle are fully unsaturated. Some embodiments of monocyclic heterocycles are 5-7 membered saturated, partially saturated or fully unsaturated ring system (this latter subset also herein referred to as unsaturated heteroaromatic) containing in the ring from one to four heteroatoms selected from nitrogen, oxygen and sulfur, wherein the sulfur and nitrogen heteroatoms may be optionally oxidized. The heterocycle may be substituted or unsubstituted.

As used herein, the term "aryl" refers to a monovalent aromatic hydrocarbon radical of 6-20 carbon atoms derived by the removal of one hydrogen atom from a single carbon atom of a parent aromatic ring system. Examples of aryl include, but are not limited to, radicals derived from benzene, substituted benzene, phenyl, tolyl, o-xylyl, naphthyl, anthracene, biphenyl, and the like. The aryl may be substituted or unsubstituted.

ABBREVIATIONS

Methyl methacrylate=MMA
Poly(methylhydrosiloxane)=PMHS
PAN=polyaniline
P(Si-g-MMA)=copolymer of PMHS and MMA
P(Si-g-MMA)-PAN=graft-like copolymer of P(Si-g-MMA) and PAN Polymer Compositions Some embodiments disclosed herein include a composition having a first polymer and a second polymer, wherein the first polymer comprises at least one first monomer unit represented by Formula I, and at least one second monomer unit represented by Formula II:

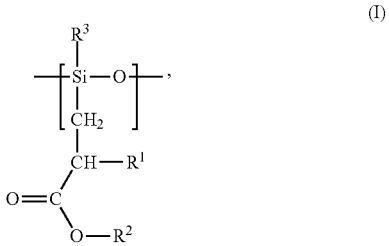

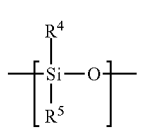

(II)

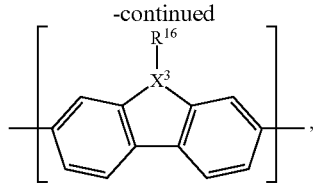

wherein $R^1$ is selected from the group consisting of hydrogen, $C_1$-$C_{12}$ alkyl, and $R^6$—COOR$^7$, wherein $R^6$ is absent or $C_1$-$C_{12}$ alkyl, and $R^7$ is hydrogen or $C_1$-$C_{12}$ alkyl; $R^2$ is $C_1$-$C_{12}$ alkyl; $R^3$, $R^4$ and $R^5$ are each independently selected from the group consisting of alkyl, alkenyl, alkynyl, aryl, and cycloalkyl, and the second polymer comprises a recurring unit having a n-conjugated electron system.

In some embodiments, $R^1$ is hydrogen. In some embodiments, $R^1$ is $C_1$-$C_{12}$ alkyl. In some embodiments, $R^1$ is $C_1$-$C_6$ alkyl. In some embodiments, $R^1$ is methyl or ethyl. In some embodiments, $R^1$ is $R^6$—COOR$^7$, where $R^6$ is absent or $C_1$-$C_6$ alkyl, and $R^7$ is hydrogen or $C_1$-$C_6$ alkyl. In some embodiments, $R^1$ is —COOH. In some embodiments, $R^1$ is —CH$_2$—COOH, —C$_2$H$_4$—COOH, or —C$_3$H$_6$—COOH.

In some embodiments, $R^2$ is $C_1$-$C_6$ alkyl. In some embodiments, $R^2$ is methyl or ethyl.

In some embodiments, $R^1$ is hydrogen, $C_1$-$C_6$ alkyl, or $R^6$—COOR$^7$, wherein $R^6$ is absent or $C_1$-$C_6$ alkyl, and $R^7$ is hydrogen or $C_1$-$C_6$ alkyl, and $R^2$ is $C_1$-$C_6$ alkyl. In some embodiments, $R^1$ and $R^2$ are independently $C_1$-$C_6$ alkyl. In some embodiments, $R^1$ and $R^2$ are methyl.

In some embodiments, $R^3$, $R^4$ and $R^5$ are each independently selected from the group consisting of $C_1$-$C_{12}$ alkyl, $C_2$-$C_{12}$ alkenyl, $C_2$-$C_{12}$ alkynyl, phenyl, and $C_3$-$C_{12}$ cycloalkyl. In some embodiments, $R^3$, $R^4$ and $R^5$ are each independently $C_1$-$C_{12}$ alkyl or $C_2$-$C_{12}$ alkenyl. In some embodiments, $R^3$, $R^4$ and $R^5$ are each independently methyl, ethyl, propyl, butyl, octyl, trifluoropropyl, phenyl, or vinyl. In some embodiments, at least one of $R^3$, $R^4$ and $R^5$ is methyl. In some embodiments, $R^3$, $R^4$ and $R^5$ are methyl.

In some embodiments, the first monomer unit is:

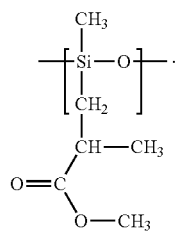

In some embodiments, the recurring unit is selected from the group consisting of:

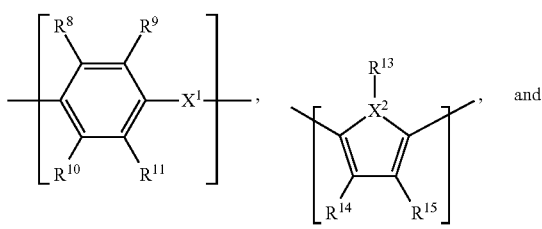

wherein $X^1$ is selected from the group consisting of —C$_2$H$_2$, —C≡C—, —OR$^{12}$, —SR$^{12}$, and —NR$^{12}$;

$X^2$ and $X^3$ are each independently selected from the group consisting of C, O, S, and N;

$R^8$ and $R^9$ are each independently selected from the group consisting of hydrogen, $C_1$-$C_6$ alkyl and $C_1$-$C_6$ alkoxy, or $R^8$ and $R^9$ are taken together to form a cycloalkyl, aryl or heterocycle;

$R^{10}$ and $R^{11}$ are each independently selected from the group consisting of hydrogen, $C_1$-$C_6$ alkyl and $C_1$-$C_6$ alkoxy, or $R^{10}$ and $R^{11}$ are taken together to form a cycloalkyl, aryl or heterocycle;

$R^{12}$ is absent or selected from the group consisting of hydrogen, $C_{1-6}$ alkyl, and $C_1$-$C_6$ alkoxy;

$R^{13}$ is absent or selected from the group consisting of hydrogen, $C_1$-$C_6$ alkyl, and aryl;

$R^{14}$ and $R^{15}$ are each independently selected from the group consisting of hydrogen, $C_1$-$C_6$ alkyl and $C_1$-$C_6$ alkoxy, or $R^{14}$ and $R^{15}$ are taken together to form a cycloalkyl, aryl or heterocycle; and $R^{16}$ is absent or selected from the group consisting of hydrogen, $C_1$-$C_6$ alkyl and aryl.

In some embodiments, the recurring unit is

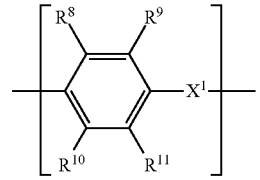

In some embodiments, $R^8$, $R^9$, $R^{10}$, and $R^{11}$ are each hydrogen. In some embodiments, $X^1$ is —C$_2$H$_2$—. In some embodiments, $X^1$ is —C≡C—. In some embodiments, $R^{12}$ is absent. In some embodiments, the recurring unit is:

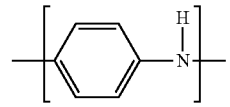

In some embodiments, the second polymer is polyaniline, polyphenylene, polythiophene, polyfuran, polypyrrole, polycarbozole, polyphenylenevinylene (PPV), poly(phenylene ethynylene) (PPE), or a derivative thereof. In some embodiments, the second polymer is polyaniline, polythiophene, or a derivative thereof. In some embodiments, the second polymer is polyaniline or a derivative thereof. In some embodiments, the second polymer is polyaniline.

The weight ratio of the first polymer to the second polymer in the composition can vary. For example, the composition can have a weight ratio of the first polymer to the second polymer of about 1:99, about 2:98, about 3:97, about 4:96, about 5:95, about 6:94, abut 7:93, about 8:92, about 9:91, about 10:90, about 11:89, about 12:88, about 13:87, about 15:85, about 16:84, about 17:83, about 18:82, about 19:81, about 20:80, about 25:75, about 30:70, about 35:65, about 40:60, about 45:55, about 50:50, about 60:40, about 70:30, about 80:20, about 90:10, about 95:5, about 99:1, or a range between any two of these values. In some embodiments, the composition can have a weight ratio of the first polymer to the second polymer of at least about 1:99, at least about 5:95, at least about 10:90, at least about 15:85, at least about 20:80, at least about 25:75, at least about 30:70, at least about 40:60, at least about 50:50, at least about 60:40, at least about 70:30, at least about 80:20, or at least about 90:10. In some embodiments, the composition has a weight ratio of the first polymer to the second polymer of about 1:99 to about 99:1. In some embodiments, the composition has a weight ratio of the first polymer to the second polymer of about 5:95 to about 90:10. In some embodiments, the composition has a weight ratio of the first polymer to the second polymer of about 5:95 to about 20:80.

It will be appreciated that the composition may optionally include other polymers. The amount of other polymers can be an effective amount that does not substantially alter the electrical conductive properties of the composition. The amount of other polymers in the composition can be, for example, less than or equal to about 10% by weight; less than or equal to about 5% by weight; less than or equal to about 3% by weight; less than or equal to about 2% by weight; less than or equal to about 1% by weight; or less than or equal to about 0.5% by weight.

The way in which the first polymer interacts with the second polymer in the composition is not in any way limited. For example, the first polymer can interact with the second polymer via covalent bonding, non-covalent bonding, or any combinations thereof. In some embodiments, the first polymer and the second polymer are coupled through hydrogen bonding. In some embodiments, the first polymer and the second polymer are coupled through covalently bonding. In some embodiments, the first polymer interacts with the second polymer through graft copolymerization.

The average molecular weight of the composition can vary. For example, the composition can have an average molecular weight of about $1 \times 10^3$ g/mol, about $5 \times 10^3$ g/mol, about $6 \times 10^3$ g/mol, about $1 \times 10^4$ g/mol, about $2 \times 10^4$ g/mol, about $3 \times 10^4$ g/mol, about $4 \times 10^4$ g/mol, about $5 \times 10^4$ g/mol, about $6 \times 10^4$ g/mol, about $7 \times 10^4$ g/mol, about $8 \times 10^4$ g/mol, about $9 \times 10^4$ g/mol, about $1 \times 10^5$ g/mol, about $1.5 \times 10^5$ g/mol, about $2 \times 10^5$ g/mol, about $2.5 \times 10^5$ g/mol, about $3 \times 10^5$ g/mol, about $3.5 \times 10^5$ g/mol, about $4 \times 10^5$ g/mol, about $4.5 \times 10^5$ g/mol, about $5 \times 10^5$ g/mol, about $6 \times 10^5$ g/mol, about $7 \times 10^5$ g/mol, about $8 \times 10^5$ g/mol, about $9 \times 10^5$ g/mol, about $1 \times 10^6$ g/mol, or a range between any two of these values. In some embodiments, the composition has an average molecular weight of about $1.0 \times 10^4$ g/mol to about $3.5 \times 10^5$ g/mol.

The compositions disclosed herein, in some embodiments, are soluble in organic solvents. For example, the composition can be soluble in at least one, at least two, at least three, at least four, at least five, at least six, or more organic solvents. In some embodiments, the composition is soluble in at least one organic solvent. In some embodiments, the organic solvent is toluene, acetone, tetrahydrofuran (THF), dimethyl formamide (DMF), dichloroacetic acid (DCAA), or any combinations thereof.

The compositions disclosed herein, in some embodiments, are conducting polymer materials. For example, the compositions can exhibit electrical conductivity. The electrical conductivity of the composition can vary. For example, the electrical conductivity of the composition can be about $10^{-5}$ S/cm, about $5 \times 10^{-4}$ S/cm, about $10^{-4}$ S/cm, about $5 \times 10^{-4}$ S/cm, about $10^{-3}$ S/cm, about $5 \times 10^{-3}$ S/cm, about $10^{-2}$ S/cm, about $5 \times 10^{-2}$ S/cm, about 0.1 S/cm, about 0.5 S/cm, about 1 S/cm, about 5 S/cm, about 10 S/cm, about 15 S/cm, about 20 S/cm, about 25 S/cm, about 30 S/cm, about 35 S/cm, about 40 S/cm, or a range of any two of these values. In some embodiments, the electrical conductivity of the composition can be at least about $10^{-5}$ S/cm, at least about $10^{-4}$ S/cm, at least about $10^{-3}$ S/cm, at least about $10^{-2}$ S/cm, at least about 0.1 S/cm, at least about 0.5 S/cm, at least about 1 S/cm, at least about 5 S/cm, at least about 10 S/cm, at least about 15 S/cm, or at least about 20 S/cm. In some embodiments, the composition has an electrical conductivity of about $10^{-5}$ S/cm to about 20 S/cm. In some embodiments, the composition has an electrical conductivity of about 0.1 S/cm to about 20 S/cm. In some embodiments, the composition has an electrical conductivity of about 10 S/cm to about 20 S/cm.

The composition, in some embodiments, can be processed into in a variety of forms. For example, the composition can be in the form of a film, membrane, rod, filament, fiber, or combinations thereof. In some embodiments, the composition has the form of a film. The thickness of the film can also vary. For example, the film can have an average thickness of about 0.1 mm, about 0.2 mm, about 0.3 mm, about 0.4 mm, about 0.5 mm, about 1 mm, about 2 mm, about 3 mm, about 4 mm, about 5 mm, about 8 mm, about 10 mm, or a range between any two of these values. In some embodiments, the film has an average thickness of at least about 0.1 mm, at least about 0.5 mm, at least about 1 mm, at least about 3 mm, at least about 5 mm, or at least about 10 mm. In some embodiments, the film has an average thickness of about 0.1 mm to about 5 mm. In some embodiments, the film has an average thickness of about 0.4 mm. In some embodiments, the film is a conducting film.

The stress at break of the film can also vary. For example, the film can have a stress at break of about 0.5 MPa, about 1 MPa, about 1.5 MPa, about 2 MPa, about 2.5 MPa, about 3 MPa, about 3.5 MPa, about 4 MPa, about 4.5 MPa, about 5 MPa, about 5.5 MPa, about 6 MPa, about 6.5 MPa, about 7 MPa, about 7.5 MPa, about 8 MPa, about 8.5 MPa, about 9 MPa, about 10 MPa, or a range of any two of these values. In some embodiments, the film has a stress at break of at least about 1 MPa, at least about 3 MPa, at least about 4 MPa, at least about 5 MPa, at least about 6 MPa, or at least about 10 MPa. In some embodiments, the film has a stress at break of about 3 MPa to about 6 MPa.

The film can have various Young's modulus. For example, the film can have a Young's modulus of about 50 MPa, about 100 MPa, about 125 MPa, about 150 MPa, about 175 MPa, about 200 MPa, about 225 MPa, about 250 MPa, about 275 MPa, about 300 MPa, or a range between any two of these values. In some embodiments, the film can have a Young's modulus of at least about 50 MPa, at least about 100 MPa, at least about 125 MPa, at least about 150 MPa, at least about 175 MPa, at least about 200 MPa, at least about 250 MPa. In some embodiments, the film has a Young's modulus of about 100 MPa to about 200 MPa. In some embodiments, the film has a Young's modulus of about 120 MPa. In some embodiments, the film has a Young's modulus of about 170 MPa.

The strain break of the film can vary. For example, the film can have a strain break of about 10%, about 15%, about 20%, about 25%, about 30%, about 35%, about 40%, about 45%, about 50%, or a range between any two of these values. In some embodiments, the film has a strain break of at least about 10%, at least about 20%, at least about 30%, at least about 40%. In some embodiments, the film has a strain break of about 20% to about 40%. In some embodiments, the film has a strain break of about 25%.

Some embodiment disclosed herein provide compositions having a first polymer and a second polymer, wherein the first polymer is an insulating matrix polymer and the second polymer is a conducting polymer, wherein the first polymer has a backbone and one or more graft-like sites, and wherein the second polymer interacts with the first polymer through at least one of the one or more graft-like sites.

As used herein, the term "graft-like site" refers to a functional group on the side chain of a polymer to which another polymer can interact through any types of interactions (including ionic interaction, coordination or hydrogen bond). For example, the carbonyl group on the side chain of P(Si-g-MMA) polymer as disclosed are graft-like sites to which a second polymer, such as polyaniline, can interact through hydrogen bonding with —NH group.

In some embodiments, the insulating matrix polymer is an elastomer. In some embodiments, the insulating matrix polymer comprises polysilicone. In some embodiments, the insulating matrix polymer comprises polymethylhydrosiloxane (PMHS) or polydimethylsiloxane (PDMS). In some embodiments, the elastomer comprises PMHS-MMA copolymer. In some embodiments, the conducting polymer is polyaniline, polyphenylene, polythiophene, polyfuran, polypyrrole, polycarbozole, polyphenylenevinylene, poly(phenylene ethynylene), or a derivative thereof. In some embodiments, the conducting polymer is polyaniline or a derivative thereof. In some embodiments, the conducting polymer is polyaniline.

Method of Making Polymer Compositions

Some embodiments disclosed herein include a method of making a conducting polymer composition, the method include forming a first mixture having at least one catalyst, polymethylhydrosiloxane (PMHS), and a compound represented by Formula III:

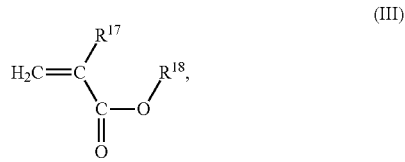

wherein $R^{17}$ is selected from the group consisting of hydrogen, $C_{1\text{-}12}$ alkyl, and $R^{19}$—$COOR^{20}$, wherein $R^{19}$ is absent or $C_{1\text{-}12}$ alkyl, $R^{20}$ is hydrogen or $C_{1\text{-}12}$ alkyl; and $R^{18}$ is $C_{1\text{-}12}$ alkyl; maintaining the first mixture under conditions effective to polymerize the PMHS and the compound to form a copolymer; forming a second mixture comprising at least one oxidizing agent, the copolymer, and at least one aniline monomer; and maintaining the second mixture under conditions effective to polymerize aniline monomer to form polyaniline.

In some embodiments, $R^{17}$ is hydrogen. In some embodiments, $R^{17}$ is $C_{1\text{-}12}$ alkyl. In some embodiments, $R^{17}$ is $C_{1\text{-}6}$ alkyl. In some embodiments, $R^{17}$ is methyl or ethyl. In some embodiments, $R^{17}$ is $R^{19}$—$COOR^{24}$. In some embodiments, $R^{17}$ is COOH. In some embodiments, $R^{17}$ is —$CH_2$—COOH, —$C_2H_4$—COOH, or —$C_3H_6$—COOH.

In some embodiments, $R^{18}$ is $C_{1\text{-}12}$ alkyl. In some embodiments, $R^{19}$ is $C_{1\text{-}6}$ alkyl. In some embodiments, $R^{18}$ is methyl or ethyl. In some embodiments, $R^{18}$ and $R^{19}$ are each methyl.

Non-limiting examples of the compound include methyl methacrylate MMA), methyl acrylate, monomethylthaconate, or combination thereof. In some embodiments, the compound is MMA. In some embodiments, the compound is monomethylthaconate. A non-limiting example of synthesizing monomethylthaconate is shown in Scheme 1.

Scheme 1

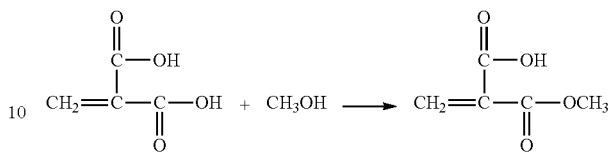

The steps and/or conditions for polymerizing PMHS and the compound to form a copolymer are not particularly limited and may be varied depending upon the desired properties of the copolymer and/or the conducting polymer composition. For example, various solvent may be included in the mixture having PHMS, catalyst and the compound. The polymerization solvent can be, for example, an organic solvent, such as toluene. Various catalysts can be used to polymerize PMHS and the compound. Non-limiting examples of catalyst include dicyclopentadienyl platinum(II) chloride ($Cp_2PtCl_2$) and $H_2PtCl_6$. In some embodiments, the catalyst is $Cp_2PtCl_2$. In some embodiments, $Cp_2PtCl_2$ can be synthesized from hydrated hexachloroplatinic acid(IV) and dicyclopentadiene. The copolymer formed by polymerizing PMHS and the compound can, in some embodiments, be dissolved in an organic solvent such as hexane and purified by filtration or centrifugation.

The molar ratio of PMHS to the compound in the first mixture can be modified, for example, to adjust the properties of the polymer. The relative molar ratio of PMHS to the compound in the first mixture can be, for example, at least about 0.5:1, at least about 0.6:1, at least about 0.7:1, at least about 0.8:1, at least about 0.9:1, at least about 1:1, at least about 1.1:1, at least about 1.2:1, at least about 1.3:1, at least about 1.4:1, at least about 1.5:1, at least about 2:1, at least about 2.5:1, or at least about 3:1. The relative molar ratio of PMHS to the compound in the first mixture can be, for example, about 2:1, about 1.5:1, about 1:1, or about 0.5:1. In some embodiments, the relative molar ratio of PMHS to the compound is about 1:1.

After forming the first mixture having the catalyst, PMHS, and the compound, the first mixture can be maintained at conditions effective to polymerize the PMHS and the compound to form the copolymer. For example, the composition can be maintained at about atmospheric pressure and a temperature of about 50° C. to about 150° C., about 60° C. to about 140° C., about 70° C. to about 130° C., about 80° C. to about 120° C., about 85° C. to about 115° C., about 90° C. to about 110° C., or about 95° C. to about 105° C. In some embodiments, the temperature can be about 80° C. to about 120° C. In some embodiments, the temperature can be about 90° C. to about 110° C. In some embodiments, the temperature can be about 100° C. Non-limiting examples of polymerization temperature include about 50° C., about 70° C., about 90° C., about 95° C., about 100° C., about 105° C., about 110° C., about 115° C., and ranges between any two of these values.

The first mixture can be maintained at the conditions for a period of time sufficient to obtain the copolymer. The first mixture, for example, can be maintained at the conditions for at least about 1 hour, at least about 3 hours, at least about 4 hours, at least about 6 hours, at least about 9 hours, at least about 12 hours, at least about 15 hours, at least about 18 hours, at least about 21 hours, at least about 24 hours, at least about 36 hours, and ranges between any two of these values. In some embodiments, the polymerization time for obtaining the copolymer is from about 4 hours to 24 hours. In some embodiments, the polymerization time for obtaining the copolymer is about 6 hours.

The steps and/or conditions for forming polyaniline in the second mixture are not particularly limited and may be varied depending up the desired properties of the polyaniline and/or the conducting polymer composition. For example, various solvents may be included in the composition having the copolymer, the aniline monomers and oxidizing agent. The polymerization solvent can be, for example, water or an organic solvent, such as tetrahydrofuran (THF) or mixtures thereof (e.g., 80:20 by vol. of THF-$H_2O$). In some embodiments, the monomer and oxidizing agent may be in an acid solution. The pH of the solution can be, for example, less than or equal to about 4; less than or equal to about 3; less than or equal to about 2; or less than or equal to about 1. In some embodiments, the pH of the solution is about 1. As one example, the polymerization solvent can include a protonic acid, such as 36.5% HCl. Skilled artisan will appreciate that various other pH modifying agents could also be used to adjust and/or maintain the pH of the composition to a desired pH.

In some embodiments, the step of forming the second mixture includes mixing the copolymer and the aniline monomer to form a third mixture, maintaining the third mixture in an acidic condition, and adding the oxidizing agent to the third mixture to form the second mixture.

The oxidative agent is not particularly limited. The oxidizing agent can be, for example, ammonium persulfate, sodium persulfate, potassium persulfate, $FeCl_3$, potassium iodate, a transition metal salt, hydrogen peroxide, and any combination thereof. In some embodiments, the oxidizing agent is ammonium persulfate. In some embodiments, the transition metal salt is $Ce^{4+}$ salts, $Cu^{2+}$ salts, $Cr^{6+}$ salts, $Mn^{7+}$ salts, or a combination thereof. In some embodiments, the transition metal salt is $(NH_4)_2Ce(NO_3)_6$, $CuCl_2$, $K_2CrO_4$, or $KMnO_4$.

The molar ratio of the oxidizing agent to the aniline monomer components in the second mixture can be modified, for example, to adjust the properties of the conducting polymer composition. The relative molar ratio of the oxidizing agent to the aniline monomer in the second mixture can be, for example, at least about 0.5:1, at least about 0.75:1, at least about 1:1, at least about 1.5:1, or at least about 2:1. The relative molar ratio of the aniline monomer to the oxidizing agent in the second mixture can be, for example, less than or equal to about 3:1, less than or equal to about 2:1, less than or equal to about 1:1, less than or equal to about 0.75:1, or less than or equal to about 0.5:1. In some embodiments, the relative molar ratio of the oxidizing agent to the aniline monomer is about 1:1.

The weight ratio of the copolymer to the aniline monomer in the second mixture can be modified, for example, to adjust the properties of the conducting polymer composition. The relative weight ratio of the copolymer to the aniline monomer in the second mixture can be, for example, about 10:1, about 9:1, about 8:1, about 7:1, about 6:1, about 5:1, about 4:1, about 3:1, about 2:1, about 1:1, about 1:3, about 1:5, about 1:8, about 1:10, about 1:13, about 1:15, about 1:18, about 1:20, or a range between any two of these values. The relative molar ratio of the aniline monomer to the copolymer in the second mixture can be, for example, less than or equal to about 20:1, less than or equal to about 15:1, less than or equal to about 10:1, less than or equal to about 8:1, less than or equal to about 5:1, less than or equal to about 2:1, less than or equal to about 1:1, less than or equal to about 1:5, or less than or equal to about 1:10. In some embodiments, the relative weight ratio of the copolymer to the aniline monomer is about 4:1.

After forming the second mixture having the copolymer, aniline and oxidizing agent, the second mixture can be maintained at conditions effective to polymerize aniline to form polyaniline. For example, the second mixture can be maintained at about atmospheric pressure and a temperature of about 0° C. to about 80° C., about 5° C. to about 70° C., about 10° C. to about 60° C., about 15° C. to about 50° C., about 20° C. to about 40° C., or about 25° C. to about 35° C. In some embodiments, the temperature can be about 15° C. to about 25° C. Non-limiting examples of polymerization temperature include about 15° C., about 20° C., about 25° C., about 30° C., about 35° C., about 40° C., about 45° C., about 50° C., and ranges between any two of these values.

The second mixture can be maintained at the conditions for a period of time sufficient to obtain polyaniline. The second mixture, for example, can be maintained at the conditions for at least about 6 hours, at least about 12 hours, at least about 18 hours, at least about 24 hours, at least about 30 hours, at least about 36 hours, at least about 48 hours, at least about 60 hours, at least about 72 hours, at least about 84 hours, at least about 96 hours, at least about 108 hours. In some embodiments, the second mixture can be maintained at the conditions for about 6 hours, about 12 hours, about 24 hours, about 48 hours, about 60 hours, about 72 hours, about 84 hours, about 96 hours, or a range between any two of these values. In some embodiments, the polymerization time is from about 24 hours to 96 hours. In some embodiments, the polymerization time is about 48 hours.

The present disclosure also provides the polymer compositions that are prepared according to any of the methods disclosed herein.

Method of Making Polymer Compositions

Some embodiments disclosed herein include a method for making a conductive polymer film disclosed herein, the method include forming a mixture that include a polymer composition and an organic solvent, wherein the polymer composition include a first polymer and a second polymer, wherein the first polymer comprises at least one first monomer unit represented by Formula IV, and at least one second monomer unit represented by Formula V:

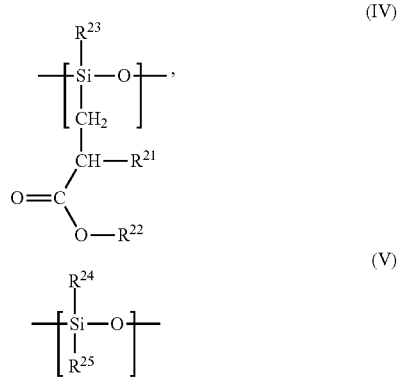

wherein $R^{21}$ is selected from the group consisting of hydrogen, $C_1$-$C_{12}$ alkyl, and $R^{26}$—$COOR^{27}$, wherein $R^{26}$ is absent or $C_1$-$C_{12}$ alkyl, and $R^{27}$ is hydrogen or $C_1$-$C_{12}$ alkyl; $R^{22}$ is $C_1$-$C_{12}$ alkyl; $R^{23}$, $R^{24}$ and $R^{25}$ are each independently selected from the group consisting of alkyl, alkenyl, alkynyl, aryl, and cycloalkyl; and the second polymer comprises a recurring unit having a π-conjugated electron system; and contacting the mixture with a solid support to form the conducting polymer film.

In some embodiments, $R^{21}$ is hydrogen. In some embodiments, $R^{21}$ is $C_1$-$C_{12}$ alkyl. In some embodiments, $R^{21}$ is $C_1$-$C_6$ alkyl. In some embodiments, $R^{21}$ is methyl or ethyl. In some embodiments, $R^{21}$ is $R^6$—$COOR^7$. In some embodiments, $R^{21}$ is —COOH. In some embodiments, $R^{21}$ is —$CH_2$—COOH, —$C_2H_4$—COOH, or —$C_3H_6$—COOH.

In some embodiments, $R^{22}$ is $C_1$-$C_6$ alkyl. In some embodiments, $R^{22}$ is methyl or ethyl. In some embodiments, $R^{21}$ and $R^{22}$ are methyl.

In some embodiments, $R^{23}$, $R^{24}$ and $R^{25}$ are each independently selected from the group consisting of $C_1$-$C_{12}$ alkyl, $C_2$-$C_{12}$ alkenyl, $C_2$-$C_{12}$ alkynyl, phenyl, and $C_3$-$C_{12}$ cycloalkyl. In some embodiments, $R^{23}$, $R^{24}$ and $R^{25}$ are each independently $C_1$-$C_{12}$ alkyl or $C_2$-$C_{12}$ alkenyl. In some embodiments, $R^{23}$, $R^{24}$ and $R^{25}$ are each independently methyl, ethyl, propyl, butyl, octyl, trifluoropropyl, phenyl, or vinyl. In some embodiments, at least one of $R^3$, $R^4$ and $R^5$ is methyl. In some embodiments, $R^{23}$, $R^{24}$ and $R^{25}$ are methyl.

In some embodiments, the first monomer unit is:

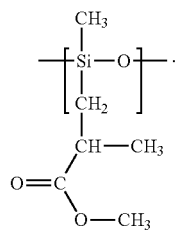

In some embodiments, the second polymer is polyaniline, polyphenylene, polythiophene, polyfuran, polypyrrole, polycarbozole, polyphenylenevinylene, poly(phenylene ethynylene), or a derivative thereof. In some embodiments, the second polymer is polyaniline, polythiophene, or a derivative thereof. In some embodiments, the second polymer is polyaniline or a derivative thereof. In some embodiments, the second polymer is polyaniline.

Various organic solvents can be used to cast the conducting polymer film in the method. Examples of the organic solvents include, but are not limited to a protonic acid, dimethyl sulfoxide (DMSO), tetrahydrofuran (THF), dimethyl formamide (DMF), dichloroacetic acid (DCAA), and any combinations thereof. In some embodiments, the organic solvent is DCAA.

The time needed for the mixture to be contacted with the solid support for forming the conducting polymer film can vary. For example, the mixture can be contacted with the solid support for about 2 hours, about 6 hours, about 9 hours, about 12 hours, about 15 hours, about 18 hours, about 21 hours, about 24 hours, about 48 hours, about 64 hours, or a range between any two of these values. In some embodiments, the mixture is contacted with the solid support for about 2 hours to about 48 hours. In some embodiments, the mixture is contacted with the solid support for about 24 hours to about 48 hours.

The solid support that can be used to form the conducting polymer film is not particularly limited. The solid support can comprise, for example, glass, polymethylpentene (TPX), polyethylene, polyethylene terephthalate (PET), or combinations thereof. In some embodiments, the solid support comprises polyethylene. Skilled artisan will appreciate that, in some instances, the conducting polymer films can be easily removed from the solid support as free-standing films.

The polymer compositions disclosed herein can be particularly advantageous in applications, such as corrosion protection of metals, light-emitting devices, materials for catalysts, electrodes, and sensors. For example, some embodiments enclosed herein provide an electrode on a substrate and a sensing member covering the electrode, wherein the sensing member comprising any of the polymer compositions disclosed herein.

EXAMPLES

Additional embodiments are disclosed in further detail in the following examples, which are not in any way intended to limit the scope of the claims.

Example 1

Preparation of P(Si-g-MMA)

Ester functionalized linear polysiloxanes was prepared according to the procedures described in Gunaydin et al. Polymer Bulletin, 47: 501-508 (2002) and Bozkurta et al. Journal of Applied Polymer Science, 85:52-56 (2002).

0.3 mol PMHS (0.5% H (wt %) or 0.18% H (wt %)) and 0.31 mmol MMA were placed in a flask with dry toluene (100 ml) and heated to 100° C. under $N_2$, and 100 μl of $Cp_2PtCl_2$ catalyst (2% solution in $CH_2Cl_2$) was then injected. The reaction mixture was stirred at the reaction temperature for 6 hours, until the IR spectrum of the mixture showed the disappearance of the 2157 $cm^{-1}$ Si—H characteristic band. After solvent evaporating, the silicone product was dissolved in hexane to remove poly(methylmethacrylate) (PMMA) residue because PMMA is not soluble in hexane. The final product P(Si-g-MMA) was obtained by filtration or centrifugation of the solution, thereby yielding 15 g.

The preparation process of P(Si-g-MMA) is schematically described in Scheme 2:

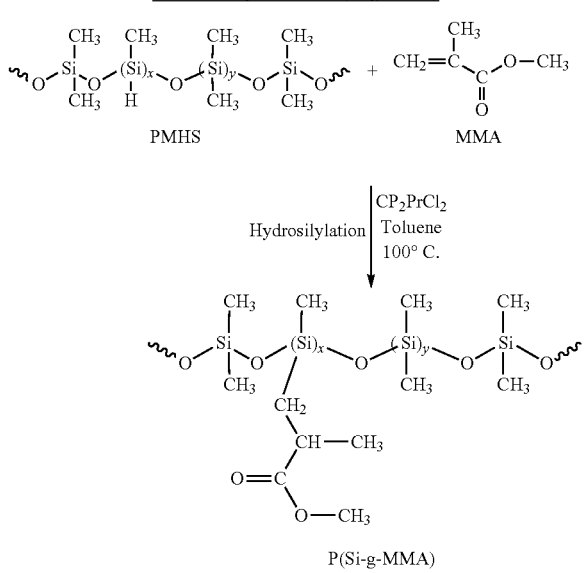

Example 2

Preparation of P(Si-g-MMA)-PAN

P(Si-g-MMA) polymers were prepared using generally the procedure described in Example 1. P(Si-g-MMA) (0.80 g) was dissolved in tetrahydrofuran/water (80 ml/20 ml) containing 200 μL of aniline (0.2 g anline) Hydrochloric acid (HCl) solution (36.5 wt %) was added into to maintain the reaction system under acidic environment (pH=1). The formed P(Si-g-MMA) solution was stirred for 5 hours at room temperature. As described in Jang & Oh, Advanced Functional Materials, 15:494-502 (2005), 10 mL of aqueous solution containing 0.502 g of ammonium persulfate (APS) oxidant was then added in 20 minutes. After continuously stirring for 48 hours, the P(Si-g-MMA)-PAN copolymer was synthesized. The P(Si-g-MMA)-PAN copolymer was collected by filtration and was dried in vacuum at 60° C.

Example 3

Preparation of P(Si-g-MMA)-PAN

P(Si-g-MMA)-PAN polymers were prepared using generally the procedure described in Example 2 except that 0.95 g P(Si-g-MMA) and 0.05 g aniline were used.

Example 4

Fourier-Transform Infrared Spectra of the P(Si-g-MMA)-PAN Polymers

P(Si-g-MMA) were prepared using generally the procedure described in Example 1, and P(Si-g-MMA)-PAN were prepared using generally the procedure described in Example 2. Fourier-transform infrared spectra (FT-IR) of polysilicone, the P(Si-g-MMA), P(Si-g-MMA)-PAN, and polyaniline (PAN) were recorded on a Bruker VECTOR22 spectrometer. The results are shown in FIG. 1.

As shown in FIG. 1, the most typical absorption peaks at 3000 cm$^{-1}$, 2157 cm$^{-1}$ and around 1222-1000 cm$^{-1}$ of polysilicone are observed corresponding to Si—CH$_3$, Si—H and Si—O—Si stretching absorptions, respectively. In the FTIR spectrum of P(Si-g-MMA), the Si—H characteristic band has disappeared demonstrating that the hydrosilylation was complete. The C=O stretching is observed at 1720 cm$^{-1}$, indicating that MMA has been successfully grafted onto polysilicone chains in P(Si-g-MMA). The absorption bands at 3000 cm$^{-1}$ of P(Si-g-MMA) are broader compared with that of polysilicone which are assigned to the incorporation of carbon/hydrogen bonds on the main chain.

The FTIR spectrum of P(Si-g-MMA)-PAN shows the characteristic bands at 1222-1000 cm$^{-1}$ for Si—O—Si stretching and 1720 cm$^{-1}$ for C=O stretching of P(Si-g-MMA). Also, P(Si-g-MMA)-PAN presents characteristic absorption peaks (1600, 1400, 1155, and 1018 cm$^{-1}$) for polyaniline, corresponding to the polyaniline ring fundamental vibration and the C—H in-plane vibration, respectively. These results show spectroscopically that polyaniline has been successfully introduced into polysilicone in P(Si-g-MMA)-PAN.

In FIG. 1, P(Si-g-MMA) shows a sharp carbonyl peak at 1734 cm$^{-1}$, while P(Si-g-MMA)-PAN shows a weak carbonyl peak at 1740 cm$^{-1}$. And, the N—H band of P(Si-g-MMA)-PAN becomes weaker as compared to that of PAN and shifts from 3407 cm$^{-1}$ to 3371 cm$^{-1}$. Without being bound by any particular theory, it is believed that the shift and weakening of the carbonyl peak and the N—H stretching are a result of hydrogen bonding interactions between the N—H in the PAN and the carbonyl groups in the P(Si-g-MMA).

This example shows that a graft-like copolymer of PAN and P(Si-g-MMA) has been synthesized.

Example 5

$^1$H NMR Spectra of P(Si-g-MMA)-PAN

P(Si-g-MMA) was prepared using generally the procedure described in Example 1, and P(Si-g-MMA)-PAN was using generally the procedure described in Example 2. P(Si-g-MMA) and P(Si-g-MMA)-PAN samples were dissolved separately in THF-d$_8$ for $^1$H NMR mensuration on a Bruker DR×500 instrument. The results of the $^1$H NMR analysis are shown in FIG. 2.

Figure 2A:
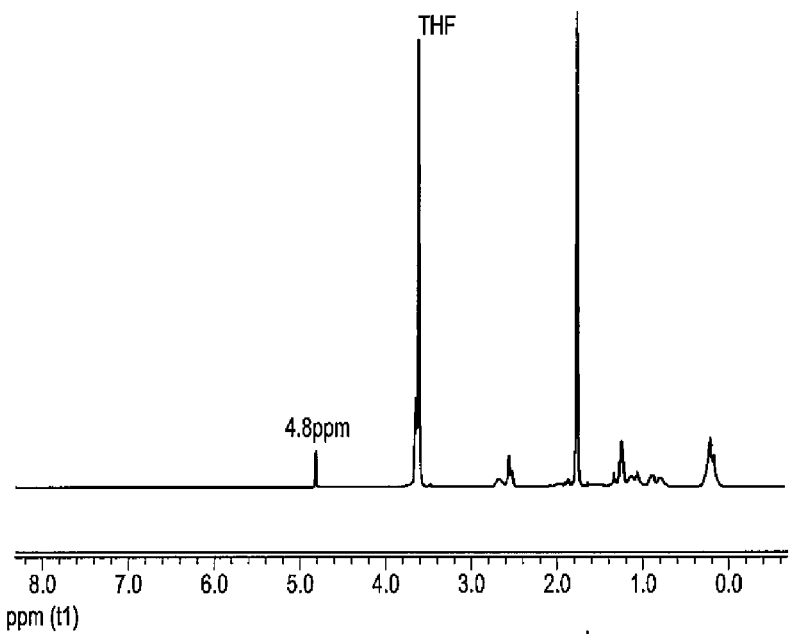
FIG. 2A shows the $^1$H NMR spectra for P(Si-g-MMA)
Figure 2B:
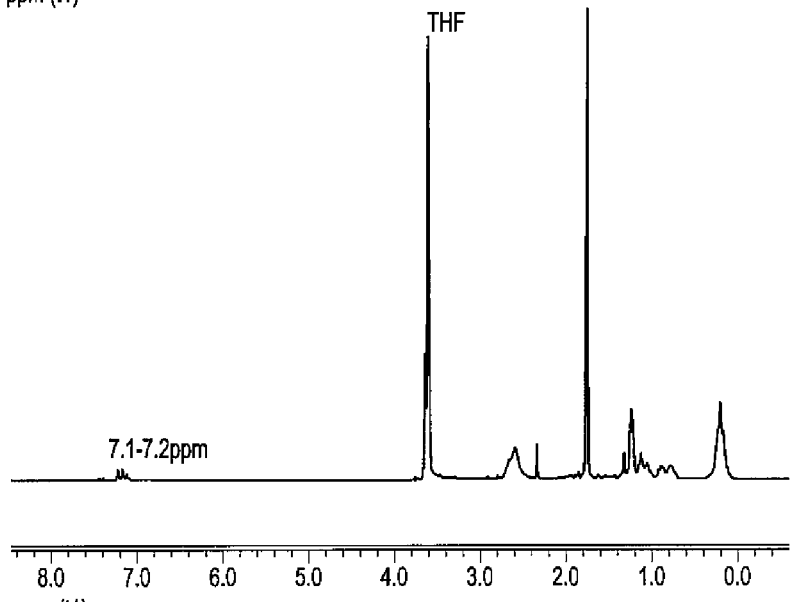
FIG. 2B shows the $^1$H NMR spectra for P(Si-g-MMA)-PAN.
Figure 2C:
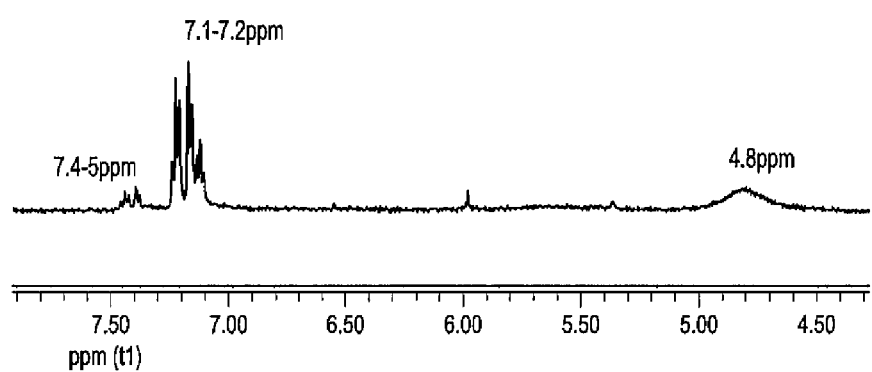
FIG. 2C is the enlargement of the $^1$H NMR spectra for P(Si-g-MMA)-PAN from 4-8 ppm.

As shown in FIG. 2, the —OCH$_3$ characteristic peak of P(Si-g-MMA) is mainly located at 4.8 ppm. Compared with that of P(Si-g-MMA), the $^1$H NMR spectrum of P(Si-g-MMA)-PAN dissolved in THF-d$_8$ displays two groups of new peaks at 7.1-7.2 ppm and 7.4-7.5 ppm, respectively, which are assigned to the hydrogen atoms in PAN rings. The —OCH$_3$ characteristic peak in the $^1$H NMR spectrum of P(Si-g-MMA)-PAN reveals a very broad and weak resonance, as compared to the sharp —OCH$_3$ characteristic peak in that of P(Si-g-MMA). This reflects that an increase of the electronic shielding effect and loss of the mobility about the carboxyl group. The results shown in FIG. 2 further indicate the formation of the hydrogen bonding between P(Si-g-MMA) and PAN.

This example further shows that a graft-like copolymer of PAN and P(Si-g-MMA) has been synthesized.

Example 6

Thermogravimetric Analysis of P(Si-g-MMA)-PAN

P(Si-g-MMA) was prepared using generally the procedure described in Example 1, and P(Si-g-MMA)-PAN was prepared using generally the procedure described in Example 2. The thermal stability of the P(Si-g-MMA) and P(Si-g-MMA)-PAN polymers were examined using thermogravimetric analysis (TGA, NETZSCH STA 449C) with a heating rate of 20 K/min from 20° C. to 800° C. The resulting TGA curves are shown in FIG. 3.

Figure 3:
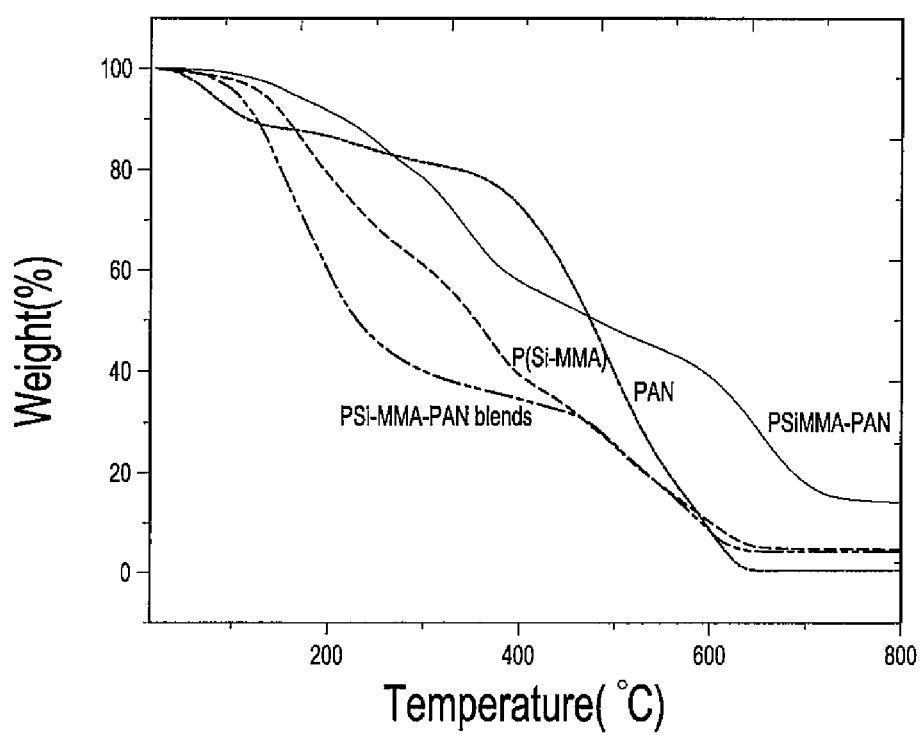
FIG. 3 shows the thermogravimetric TGA curves of PAN, P(Si-g-MMA), physical mixture of P(Si-g-MMA) and PAN polymers, and P(Si-g-MMA)-PAN.

As shown in FIG. 3, P(Si-g-MMA), a physical mixture of P(Si-g-MMA) and PAN (i.e., P(Si-g-MMA) blends), and P(Si-g-MMA)-PAN all showed small weight losses in the low temperature range (<100° C.), which was likely to be caused by the contaminating water or solvent trapped in the polymers. PAN and P(Si-g-MMA) showed a weight loss from 160° C. and 383° C., respectively, which could be attributed to the decomposition of MMA chains on the P(Si-g-MMA) copolymer and PAN backbone.

By comparison with the degradation curves of the physical mixture of P(Si-g-MMA) and PAN which has two decomposition temperature at about 140° C., 470° C., and of the P(Si-g-MMA)-PAN which has also two decomposition temperatures at about 180° C. and 590° C. The first weight loss is ascribed to the decomposition of MMA chains on the P(Si-g-MMA) copolymer. Second weight loss may be associated with the decomposition of the modified PAN. The difference in the decomposition temperature between the mixture and the copolymer may have resulted from formation of hydrogen bonding. Thus, the decomposition temperature of MMA chain on P(Si-g-MMA)-PAN is increased from about 140° C.

to 180° C., while the decomposition temperature of the graft-like modified PAN backbone is increased from about 383° C. to about 590° C.

This example shows that the hydrogen bonding state in the graft-like P(Si-g-MMA)-PAN copolymer has a substantially improved thermal stability as compared to the P(Si-g-MMA) copolymer.

Example 7

Preparation of P(Si-g-MMA)-PAN Film

P(Si-g-MMA)-PAN polymers were prepared using generally the procedure described in Examples 2 and 3. 1.20 g P(Si-g-MMA)-PAN was dissolved in 40 mL dichloroacetic acid (DCAA), THF, and DMF, respectively. The solutions were casted into the polyethylene backing, respectively, for 2 hours at 80° C. and then for 24 hours at 50° C. P(Si-g-MMA)-PAN film was formed and removed from the polyethylene backing. The P(Si-g-MMA) film was also prepared according to the same experimental procedure for comparison. The typical thickness of the resulting films was about 0.4 mm.

Electrical conductivity of the films at room temperature was determined by using four-point probe technique. Films prepared by using DMF or THF exhibited very low conductivities of $10^{-5}$ S/cm, but conductivity of the film prepared by using DCAA displayed high conductivity of about 20 S/cm.

Morphology of the P(Si-g-MMA)-PAN films casted by various organic solvents was studied by Scanning electron microscopy (SEM). The results are shown in FIG. 4. As shown in FIG. 4, P(Si-g-MMA)-PAN polymers go through conformational changes upon film-formation, that is, the polymer changes from spherical aggregates to rough or smooth films.

Figure 4A:
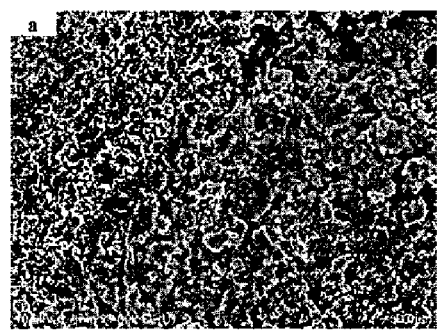
FIG. 4A-C shows SEM images of P(Si-g-MMA)-PAN films casted using (a) DMF, (b) THF, (c) DCAA.
Figure 4B:
Figure 4C:
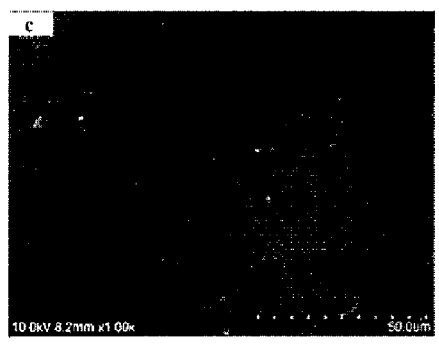
Figure 4D:
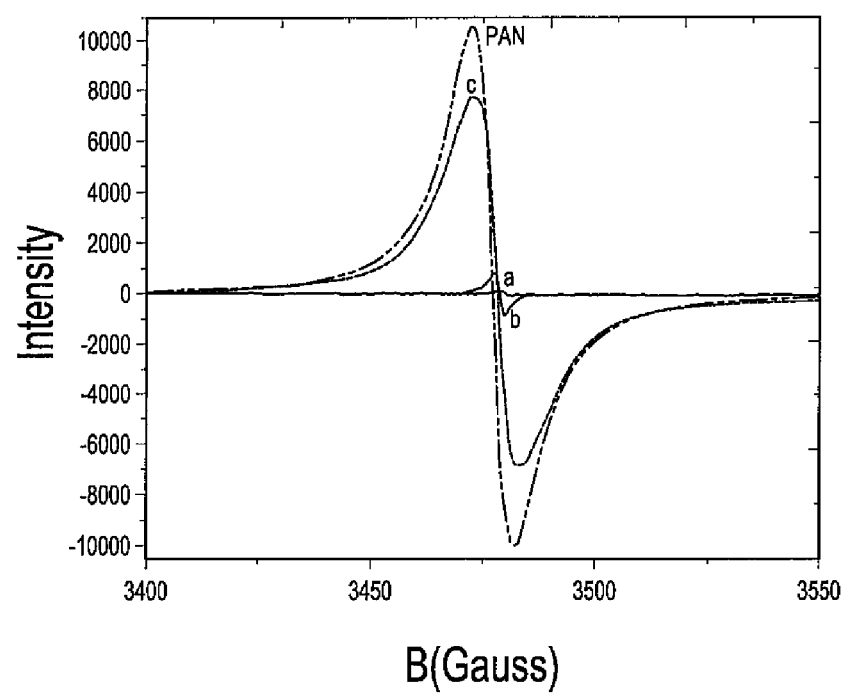
FIG. 4D shows electron paramagnetic resonance (EPR) spectra of PAN, and P(Si-g-MMA)-PAN films casted using (a) DMF, (b) THF, (c) DCAA.

Electron paramagnetic resonance (EPR) measurements of the P(Si-g-MMA)-PAN films casted using DMF, THF and DCAA were also carried out to study the solvent effect on the nature of the charge carriers in the P(Si-g-MMA)-PAN films. EPR signals were recorded on a Bruker EMX-10/12 Spectrometer (X-band) at room temperature. The results are shown in FIG. 4D. As shown in FIG. 4, pure PAN powder exhibits a strongly sharp signal, displaying a high concentration of cation radicals. Compared with that of PAN powder, the EPR signal line width in DCAA solvent is not almost weaker, while that in DMF or THF solvents decreases rapidly. This provides strong evidence that the conductivity phase has good continuity in the P(Si-g-MMA)-PAN films.

Without being bound to any particular theory, it is believed that there are at least two possibilities for the conductivity enhancement in P(Si-g-MMA)-PAN. One is the secondary doping of P(Si-g-MMA)-PAN, and another is the conformational change of the polymer chains. When P(Si-g-MMA)-PAN copolymers is dissolved in organic solvents such as DMF, THF or DCAA, the twist polysilicone chains as micelles core can swell from coil structure to line structure and accordingly force the PAN shell to expand. Because of the good compatibility of DCAA, the P(Si-g-MMA)-PAN copolymer chains can stretch out thoroughly so that the polyaniline polymer phase has good continuity necessary for good conductivity. Moreover, the conformation for a low-conductivity polyaniline film is dominated by the coil structure. After the secondary doping of DCAA as a protonic acid, the conformation of the polyaniline chains changes into the linear of expanded-coil structure, leading to the conductivity enhancement.

This example show that conductivity of the P(Si-g-MMA)-PAN films can vary based on the organic solvent used for casting the film.

Example 8

Properties of P(Si-g-MMA)-PAN

Additional P(Si-g-MMA) was prepared using generally the procedure described in Example 1, additional P(Si-g-MMA)-PAN polymers were prepared using generally the procedure described in Examples 2 and 3. Molecular weights and distributions for the P(Si-g-MMA) and P(Si-g-MMA)-PAN polymers were determined by gel permeation chromatography (Waters 1515). The results are shown in Table 1.

TABLE 1

Molecular weight and other properties of P(Si-g-MMA)-PAN and P(Si-g-MMA)

| samples | PMHS used for polymer synthesis | PAN/P(Si-g-MMA) (wt %) | Electrical Conductivity (S/cm) | Mn (g/mol) | Mw (g/mol) | PDI |
|---|---|---|---|---|---|---|
| P(Si-g-MMA) | 0.18% H (wt %) | — | — | $1.10 \times 10^4$ | $1.48 \times 10^4$ | 1.35 |
| P(Si-g-MMA) | 0.5% H (wt %) | — | — | $1.76 \times 10^5$ | $2.39 \times 10^5$ | 1.36 |
| P(Si-g-MMA)-PAN | 0.18% H (wt %) | 20/80 | 15 | $2.36 \times 10^4$ | $2.43 \times 10^4$ | 1.03 |
| P(Si-g-MMA)-PAN | 0.18% H (wt %) | 5/95 | 10 | $2.23 \times 10^4$ | $2.54 \times 10^4$ | 1.14 |
| P(Si-g-MMA)-PAN | 0.5% H (wt %) | 20/80 | 20 | $2.89 \times 10^5$ | $3.01 \times 10^5$ | 1.04 |
| P(Si-g-MMA)-PAN | 0.5% H (wt %) | 5/95 | 10 | $2.61 \times 10^5$ | $3.44 \times 10^5$ | 1.32 |

Films of P(Si-g-MMA) and P(Si-g-MMA)-PAN were casted using generally the procedure described in Example 8. Electrical conductivity of the films at room temperature was determined by using four-point probe technique. The mechanical properties were measured at room temperature using an Instron 4301 universal testing machine (Instron, USA). Briefly, the film samples prepared according to the ASTM standard D 882-01 (45×10×0.4 mm, lengt×width× thickness) were tested at a rate of 10 min/minute. Young's modulus was calculated from the linear part of the initial slope. For each sample, the test was performed 5 times. The result was averaged and a standard deviation was reported. The results are shown in Tables 1 and 2.

The stretching properties and conductivities of the P(Si-g-MMA) and P(Si-g-MMA)-PAN films are shown in Table 2.

TABLE 2

Mechanical properties of P(Si-g-MMA) and P(Si-g-MMA)-PAN copolymer film with different conductivities.

| Sample | PMHS used for polymer synthesis | PAN/P(Si-g-MMA) (wt %) | Conductivity (S/cm) | Mechanical parameters | | |
|---|---|---|---|---|---|---|
| | | | | Stress at break (MPa) | Strain at break (%) | Youngs modulus (MPa) |
| P(Si-g-MMA) | 0.18% H (wt %) | — | | 11.5 | 30.5 | 145.3 |
| P(Si-g-MMA) | 0.5% H (wt %) | — | | 13.0 | 37.1 | 100.4 |
| P(Si-g-MMA)-PAN | 0.18% H (wt %) | 20/80 | 15 | 3.0 | 22.6 | 170.2 |
| P(Si-g-MMA)-PAN | 0.5% H (wt %) | 20/80 | 20 | 5.2 | 24.2 | 120.8 |

As shown in Table 2, as the molecular weights of P(Si-g-MMA) increases, the stretching strength and conductivities of these P(Si-g-MMA)-PAN films increase. While Young's modulus of the P(Si-g-MMA)-PAN films increases with the conductivity, the strain at break decreases gradually. Also shown in Table 2, P(Si-g-MMA) film is non-conductive, and P(Si-g-MMA)-PAN film has the conductivity of 20 S/cm, which is higher than some analogous conductive conjugated polymers composites.

This example shows that P(Si-g-MMA)-PAN film has significantly enhanced electrical conductivity as compared to P(Si-g-MMA) film.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A composition comprising a first polymer and a second polymer, wherein the first polymer comprises at least one first monomer unit represented by Formula I, and at least one second monomer unit represented by Formula II:

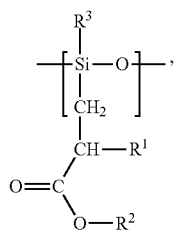
(I)

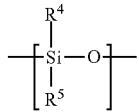
(II)

wherein $R^1$ is selected from the group consisting of hydrogen, $C_1$-$C_{12}$ alkyl, and $R^6$—$COOR^7$, wherein $R^6$ is absent or $C_1$-$C_{12}$ alkyl, $R^7$ is hydrogen or $C_1$-$C_{12}$ alkyl; $R^2$ is $C_1$-$C_{12}$ alkyl;

$R^3$, $R^4$ and $R^5$ are each independently selected from the group consisting of alkyl, alkenyl, alkynyl, aryl, and cycloalkyl; and the second polymer comprises a recurring unit having a π-conjugated electron system.

2. The composition of claim 1, wherein $R^1$ is selected from the group consisting of hydrogen, $C_1$-$C_6$ alkyl, and $R^6$—$COOR^7$, wherein $R^6$ is absent or $C_1$-$C_6$ alkyl, $R^7$ is hydrogen or $C_1$-$C_6$ alkyl; and $R^2$ is $C_1$-$C_6$ alkyl.

3. The composition of claim 1, wherein $R^1$ and $R^2$ are each independently $C_1$-$C_6$ alkyl.

4. The composition of claim 1, wherein $R^3$, $R^4$ and $R^5$ are each independently selected from the group consisting of $C_1$-$C_{12}$ alkyl, $C_2$-$C_{12}$ alkenyl, $C_2$-$C_{12}$ alkynyl, phenyl, and $C_3$-$C_{12}$ cycloalkyl.

5. The composition of claim 1, wherein $R^3$, $R^4$ and $R^5$ are each independently selected from the group consisting of methyl, ethyl, propyl, butyl, octyl, trifluoropropyl, phenyl, and vinyl.

6. The composition of claim 1, wherein the first monomer unit is:

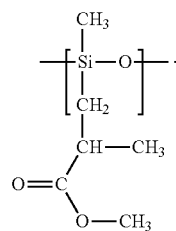

7. The composition of claim 1, wherein the recurring unit is selected from the group consisting of:

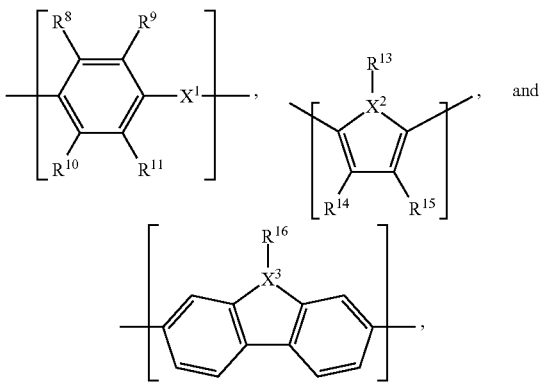

wherein
$X^1$ is selected from the group consisting of —$C_2H_2$, C≡C, $OR^{12}$, —$SR^{12}$, and —$NR^{12}$;
$X^2$ and $X^3$ are each independently selected from the group consisting of C, O, S, and N;
$R^8$ and $R^9$, are each independently selected from the group consisting of hydrogen, $C_1$-$C_{12}$ alkyl and $C_1$-$C_{12}$ alkoxy, or $R^8$ and $R^9$ are taken together to form a cycloalkyl, aryl or heterocycle;
$R^{10}$ and $R^{11}$ are each independently selected from the group consisting of hydrogen, $C_1$-$C_{12}$ alkyl and $C_1$-$C_{12}$ alkoxy, or $R^{10}$ and $R^{11}$ are taken together to form a cycloalkyl, aryl or heterocycle;
$R^{12}$ is absent or selected from the group consisting of hydrogen, $C_{1-12}$ alkyl, and $C_1$-$C_{12}$ alkoxy;
$R^{13}$ is absent or selected from the group consisting of hydrogen, $C_1$-$C_{12}$ alkyl, and aryl;
$R^{14}$ and $R^{15}$ are each independently selected from the group consisting of hydrogen, $C_1$-$C_{12}$ alkyl and $C_1$-$C_{12}$ alkoxy, or $R^{14}$ and $R^{15}$ are taken together to form a cycloalkyl, aryl or heterocycle; and
$R^{16}$ is absent or selected from the group consisting of hydrogen, $C_1$-$C_{12}$ alkyl and aryl.

8. The composition of claim 1, wherein the second polymer is selected from the group consisting of polyaniline, polyphenylene, polythiophene, polyfuran, polypyrrole, polycarbozole, polyphenylenevinylene (PPV), polyphenylene ethynylene (PPE) and derivatives thereof.

9. The composition of claim 1, wherein the composition has a weight ratio of the first polymer to the second polymer of about 1:99 to about 99:1.

10. The composition of claim 1, wherein the first polymer and the second polymer are coupled through hydrogen bonding.

11. The composition of claim 1, wherein the composition has an electrical conductivity of about $10^{-5}$ S/cm to about 20 S/cm.

12. The composition of claim 1, wherein the composition has the form of a film, membrane, rod, filament, fiber, or combinations thereof.

13. The composition of claim 1, wherein the composition has the form of a film.

14. The composition of claim 13, wherein the film has a stress at break of about 31 MPa to about 61 MPa.

15. The composition of claim 13, wherein the film has a Young's modulus of about 1001 MPa to about 2001 MPa.

16. The composition of claim 13, wherein the film has a strain break of about 20% to about 40%.

17. A method of making a conducting polymer composition, the method comprising:

forming a first mixture comprising at least one catalyst, polymethylhydrosiloxane (PMHS), and a compound represented by Formula III

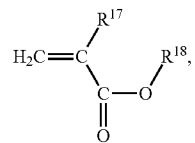

(III)

wherein $R^{17}$ is selected from the group consisting of hydrogen, $C_{1-12}$ alkyl, and $R^{19}$—COOR$^{20}$, wherein $R^{19}$ is absent or $C_{1-12}$ alkyl, $R^{20}$ is hydrogen or $C_{1-12}$ alkyl; and $R^{18}$ is $C_{1-12}$ alkyl;

maintaining the first mixture under conditions effective to polymerize the PMHS and the compound to form a copolymer;

forming a second mixture comprising at least one oxidizing agent, the copolymer, and at least one aniline monomer; and maintaining the second mixture under conditions effective to polymerize aniline monomer to form polyaniline.

18. The method of claim 17, wherein the compound is methyl methacrylate MMA), methyl acrylate, monomethylthaconate, or combination thereof.

19. The method of claim 17, wherein the oxidizing agent is selected from the group consisting of ammonium persulfate, sodium persulfate, potassium persulfate, $FeCl_3$, potassium iodate, a transition metal salt, hydrogen peroxide, and any combination thereof.

20. The method of claim 17, wherein the catalyst is $Cp_2PtCl_2$ or $H_2PtCl_6$.

21. The method of claim 17, wherein the weight ratio of the copolymer to the aniline monomer is about 10:1 to about 1:20.

22. The method of claim 17, wherein forming a second mixture comprises:

mixing the copolymer and the aniline monomer to form a third mixture;

maintaining the third mixture in an acidic condition; and adding the oxidizing agent to the third mixture to form the second mixture.

23. A polymer composition prepared according to the method of claim 17.

24. A method for making a conducting polymer film, the method comprising:

forming a mixture comprising a polymer composition and an organic solvent, wherein the polymer composition comprises a first polymer and a second polymer, wherein the first polymer comprises at least one first monomer unit represented by Formula IV, and at least one second monomer unit represented by Formula V:

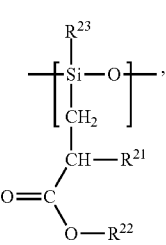

(IV)

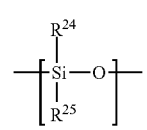

(V)

wherein $R^{21}$ is selected from the group consisting of hydrogen, $C_1$-$C_{12}$ alkyl, and $R^{26}$—COOR$^{27}$, wherein $R^{26}$ is absent or $C_1$-$C_{12}$ alkyl, and $R^{27}$ is hydrogen or $C_1$-$C_{12}$ alkyl;

$R^{22}$ is $C_1$-$C_{12}$ alkyl;

$R^{23}$, $R^{24}$ and $R^{25}$ are each independently selected from the group consisting of alkyl, alkenyl, alkynyl, aryl, and cycloalkyl; and the second polymer comprises a recurring unit having a π-conjugated electron system; and contacting the mixture with a solid support to form the conducting polymer film.

25. The method of claim 24, wherein the first monomer unit is:

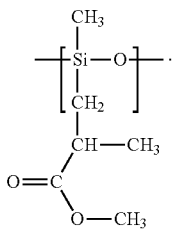

26. The method of claim 24, wherein the second polymer is selected from the group consisting of polyaniline, polyphenylene, polythiophene, polyfuran, polypyrrole, polycarbozole, polyphenylenevinylene (PPV), polyphenylene ethynylene (PPE) and derivatives thereof.

27. The method of claim 24, wherein the organic solvent is selected from the group consisting of dimethyl sulfoxide (DMSO), tetrahydrofuran (THF), dimethyl formamide (DMF), dichloroacetic acid (DCAA), and any combinations thereof.

28. A sensor comprising:
an electrode on a substrate; and
a sensing member covering the electrode, wherein the sensing member comprises a composition comprising a first polymer and a second polymer, wherein
the first polymer comprises at least one first monomer unit represented by Formula VI, and at least one second monomer unit represented by Formula VII:

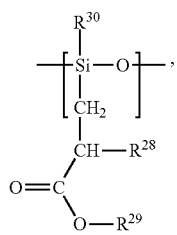
(VI)

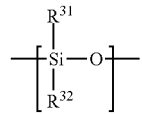
(VII)

wherein $R^{28}$ is selected from the group consisting of hydrogen, $C_{1-12}$ alkyl, and $R^{33}$—$COOR^{34}$, wherein $R^{33}$ is absent or $C_{1-12}$ alkyl, and $R^{34}$ is hydrogen or $C_{1-12}$ alkyl;

$R^{29}$ is $C_{1-12}$ alkyl; and $R^{30}$, $R^{31}$ and $R^{32}$ are each independently selected from the group consisting of alkyl, alkenyl, alkynyl, aryl, and cycloalkyl; and the second polymer comprises a recurring unit having a π-conjugated electron system.

* * * * *